(12) United States Patent
Priya

(10) Patent No.: US 12,589,750 B2
(45) Date of Patent: Mar. 31, 2026

(54) VEHICULAR CONTROL SYSTEM

(71) Applicant: Magna Electronics Inc., Auburn Hills, MI (US)

(72) Inventor: Shrestha Priya, Bihar (IN)

(73) Assignee: Magna Electronics Inc., Auburn Hills, MI (US)

( * ) Notice: Subject to any disclaimer, the term of this patent is extended or adjusted under 35 U.S.C. 154(b) by 160 days.

(21) Appl. No.: 18/392,056

(22) Filed: Dec. 21, 2023

(65) Prior Publication Data

US 2024/0217522 A1 Jul. 4, 2024

Related U.S. Application Data

(60) Provisional application No. 63/478,203, filed on Jan. 3, 2023.

(51) Int. Cl.
| | |
|---|---|
| *B60W 40/08* | (2012.01) |
| *B60W 50/00* | (2006.01) |
| *G06V 20/59* | (2022.01) |
| *G06V 40/10* | (2022.01) |
| *H04W 4/44* | (2018.01) |

(52) U.S. Cl.
CPC ........ *B60W 40/08* (2013.01); *B60W 50/0098* (2013.01); *G06V 20/597* (2022.01); *G06V 40/10* (2022.01); *H04W 4/44* (2018.02); *B60W 2050/0005* (2013.01); *B60W 2050/0083* (2013.01); *B60W 2420/403* (2013.01); *B60W 2556/45* (2020.02)

(58) Field of Classification Search
CPC ............. B60W 40/08; B60W 50/0098; B60W 2050/0005; B60W 2050/0083; B60W 2420/403; B60W 2556/45; B60W 2540/043; B60W 2540/221; B60W 2040/0809; G06V 20/597; G06V 40/10; G06V 20/59; H04W 4/44
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 7,914,187 | B2 | 3/2011 | Higgins-Luthman et al. |
| 9,405,120 | B2 | 8/2016 | Graf et al. |
| 10,017,114 | B2 | 7/2018 | Bongwald |

(Continued)

*Primary Examiner* — Sihar A Karwan
(74) *Attorney, Agent, or Firm* — HONIGMAN LLP

(57) ABSTRACT

A vehicular driver monitoring system includes a camera disposed at an interior portion of an interior cabin of a vehicle. The camera views a head region of a driver and a head region of a passenger of the vehicle. Image data captured by the camera is transferred to an ECU and processed to determine a driver profile associated with the driver and a passenger profile associated with the passenger. A first accessory of the vehicle is operable in a driver-setting and in a passenger-setting. The respective driver-setting and passenger-setting of the first accessory of the vehicle is set based on respective stored settings of the first accessory that correspond to the determined driver profile and the determined passenger profile.

28 Claims, 1 Drawing Sheet

(56) References Cited

U.S. PATENT DOCUMENTS

| | | | |
|---|---|---|---|
| 10,065,574 B2 | 9/2018 | Tiryaki | |
| 10,958,830 B2 | 3/2021 | Koravadi | |
| 11,518,401 B2 | 12/2022 | Kulkarni | |
| 11,780,372 B2 | 10/2023 | Sobecki et al. | |
| 11,827,153 B2 | 11/2023 | Miller et al. | |
| 2014/0285666 A1 | 9/2014 | O'Connell et al. | |
| 2014/0309863 A1* | 10/2014 | Ricci | H04W 4/12 |
| | | | 701/36 |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0217367 A1 | 8/2017 | Pflug et al. | |
| 2017/0274906 A1 | 9/2017 | Hassan et al. | |
| 2018/0134217 A1 | 5/2018 | Peterson et al. | |
| 2018/0222414 A1 | 8/2018 | Ihlenburg et al. | |
| 2018/0231976 A1 | 8/2018 | Singh | |
| 2019/0111937 A1* | 4/2019 | Halesha | B60W 50/08 |
| 2019/0210615 A1 | 7/2019 | Caron et al. | |
| 2020/0143560 A1 | 5/2020 | Lu et al. | |
| 2020/0202151 A1 | 6/2020 | Wacquant | |
| 2020/0320320 A1 | 10/2020 | Lynam | |
| 2021/0155167 A1 | 5/2021 | Lynam et al. | |
| 2021/0162926 A1 | 6/2021 | Lu | |
| 2021/0245662 A1 | 8/2021 | Blank et al. | |
| 2021/0291739 A1 | 9/2021 | Kasarla et al. | |
| 2021/0323473 A1 | 10/2021 | Peterson et al. | |
| 2022/0242438 A1 | 8/2022 | Sobecki et al. | |
| 2022/0254132 A1 | 8/2022 | Rother | |
| 2022/0377219 A1 | 11/2022 | Conger et al. | |
| 2023/0288928 A1 | 9/2023 | Singh | |
| 2024/0112337 A1 | 4/2024 | Wacquant | |
| 2024/0168355 A1 | 5/2024 | Baur | |
| 2024/0190456 A1 | 6/2024 | P et al. | |

* cited by examiner

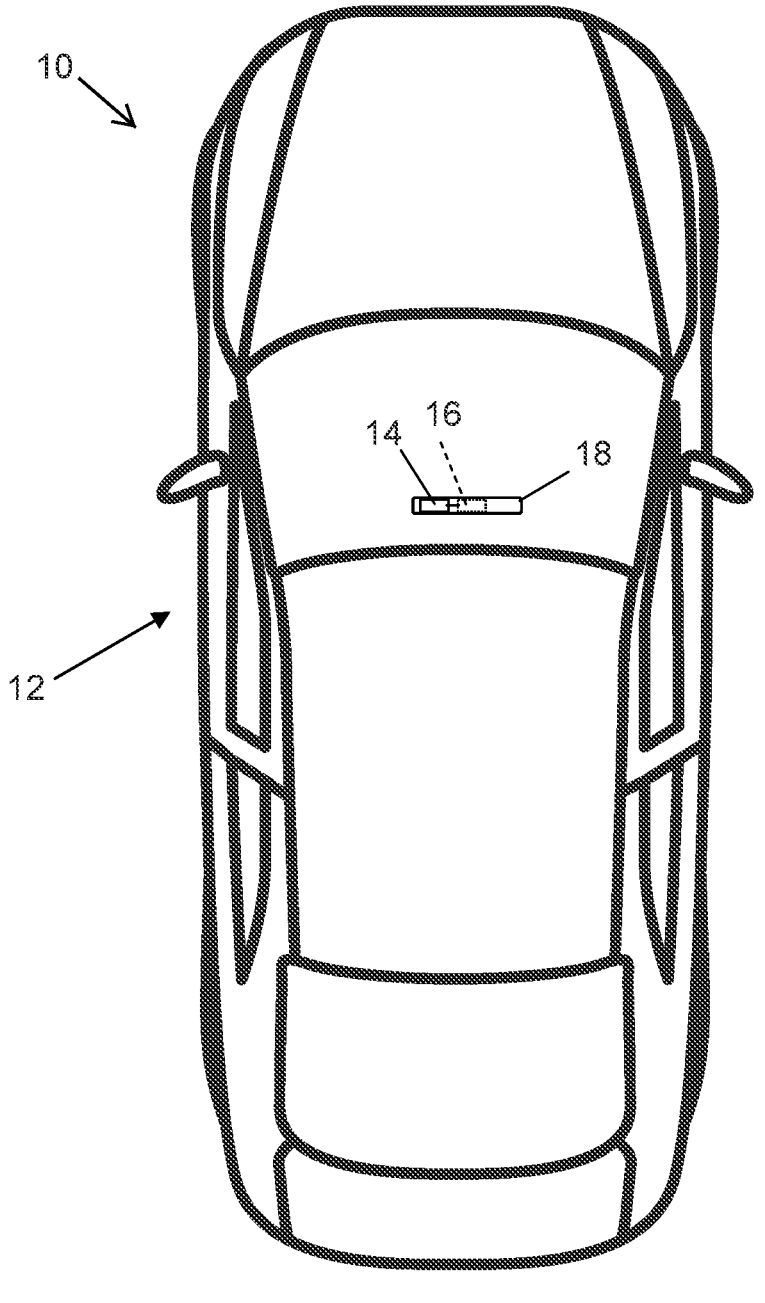

VEHICULAR CONTROL SYSTEM

CROSS REFERENCE TO RELATED APPLICATION

The present application claims the filing benefits of U.S. provisional application Ser. No. 63/478,203, filed Jan. 3, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driver monitoring system may be operable to determine a profile associated with an identity of a driver or occupant of a vehicle. The profile may be associated with a vehicle settings configuration stored in memory, where the settings configuration includes one more driver or occupant selected settings or configurations for a vehicle system. For example, the vehicle settings configuration may include the seat position or rearview mirror position or climate control preferences for the associated profile. Responsive to determining the profile associated with the vehicle driver or occupant, the vehicle system may automatically adjust its configuration to match the stored setting of the retrieved vehicle settings configuration.

For example, a driver monitoring system may include a camera disposed at an interior cabin of a vehicle equipped with the driver monitoring system and views at least a head region of the driver of the vehicle. The camera may include a CMOS imaging array having at least one million photosensors arranged in rows and columns. An electronic control unit (ECU) includes electronic circuitry and associated software, the electronic circuitry includes an image processor for processing image data captured by the camera. Image data captured by the camera is provided to the ECU. The provided captured image data is processed at the ECU for determining a profile associated with an identity of the driver. Based on the determined profile associated with the identity of the driver, a vehicle settings configuration that corresponds to the determined profile is retrieved from memory storage. Based on the vehicle settings configuration retrieved from memory storage, a setting of a vehicle system is adjusted to match a corresponding stored setting of the vehicle settings configuration.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a driver monitoring camera.

DESCRIPTION OF THE PREFERRED EMBODIMENTS

A vehicle vision system and/or driver or driving assist system and/or object detection system and/or alert system and/or driver monitoring system operates to capture images exterior and/or interior of the vehicle and may process the captured image data to monitor occupants of the vehicle and/or display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data.

Referring now to the drawings and the illustrative embodiments depicted therein, a vehicle 10 includes a driver monitoring system 12 that includes at least one interior viewing imaging sensor or camera 14, with the camera having a lens for focusing images at or onto an imaging array or imaging plane or imager of the camera (FIG. 1). The system 12 includes a control or electronic control unit (ECU) 16 that comprises electronic circuitry and associated software, with the electronic circuitry including a data processor or image processor that is operable to process image data captured by the camera or cameras (and may process image data captured by other cameras at the vehicle, such as exterior viewing cameras disposed at locations so as to have respective fields of view exterior of the vehicle) and/or may provide an output to a display device for displaying video images for viewing by the driver of the vehicle. Although shown in the illustrated embodiment as disposed at an interior rearview mirror assembly 18 of the vehicle 10, the driver monitoring camera 14 and ECU 16 may be disposed at any suitable position within the vehicle, such as at a dashboard or gauge cluster or windshield mounted electronics module or the like. The data transfer or signal communication from the camera to the ECU may comprise any suitable data or communication link, such as a vehicle network bus or the like of the equipped vehicle.

As discussed further below, the vehicle 10 is equipped with a driver or occupant preference control system that is configured to store one or more adjustable or configurable settings of one or more systems or accessories of the vehicle for one or more associated driver or occupant or user profiles and, when a particular user profile is selected, the occupant preference control system adjusts the settings of the one or more systems or accessories of the vehicle to match the stored settings associated with the selected profile. The profile may be selected automatically based on the driver or occupant monitoring system recognizing an identity of the driver or occupant that matches the profile stored by the preference control system.

The driver and/or occupant initially selects or identifies their setting preferences manually and the system stores the selected preferences according to their profile. Configurable vehicle settings that may be selected for each driver and/or occupant profile may include settings that affect vehicle operation and vehicle comfort settings. For example, configurable vehicle operation settings may include a preferred drive mode (e.g., a sport mode, an eco-mode, or an off road mode) or a preferred setting for a driver assistance system (e.g., whether a lane keep assist system for the vehicle is enabled or disabled, whether a lane departure warning is enabled or disabled, whether a parking sensor system is enabled or disabled, whether automatic high beam head-lights are enabled or disabled, whether a forward collision warning is enabled or disabled, whether traffic signal recognition is enabled or disabled, whether automatic windshield wipers are enabled or disabled, and the like). Vehicle comfort settings may include seat height and seat position settings (e.g., positions for each movable portion of the driver and/or passenger seat along the X, Y, and Z axes), interior and exterior rearview mirror positions, a position of the steering wheel, an interior lighting or ambience lighting color, a digital display setting (e.g., a gauge cluster design setting), settings related to a heating, ventilation, and air conditioning (HVAC) system of the vehicle (e.g., a temperature setting, a blower intensity, a preferred air freshener scent, a selection of which vents are active, and the like), one or more audio settings (e.g., a volume setting, an audio tuning setting like a treble level, a bass level, a left-to-right balance or a front-to-rear fade, a media selection like a radio station or audio streaming service, and the like), and the like.

After the user selects or adjusts one or more vehicle settings, the system stores the vehicle settings according to the profile associated with the user. The user may manually provide an input to store the settings (such as by providing an input at a vehicle display), or the system may automatically store the vehicle settings. For example, the system may store a current configuration of the settings for the configurable vehicle accessories under the user's profile at regular time intervals, in response to a condition (e.g., at vehicle shut down), or automatically in response to the user adjusting one or more settings. The system may store separate setting profiles for multiple occupants present in the vehicle at the same time (e.g., both the driver and one or more passengers).

After the settings are stored and associated with the user profile, the system may automatically adjust the vehicle settings to match a recognized user. That is, when the user next enters the vehicle, the system may recognize the user and automatically adjust the settings for the configurable vehicle accessories to match the settings stored with the user's profile. The system may identify the user present in the vehicle in one or more ways, such as facial recognition, voice recognition, biometric identification, or the user may manually provide an input to select their associated profile.

For example, the driver monitoring system includes a driver monitoring camera 14 that captures image data representative of the driver's head. The camera 14 may be disposed at a dashboard or instrument panel of the vehicle 10 and has the principal axis of its field of view directed toward the face of the driver. Optionally, the driver monitoring camera 14 (and associated near infrared light emitter for illuminating the driver/occupant region(s) of the interior cabin of the vehicle) may be disposed at any suitable position at the interior portion of the vehicle 10 and viewing the head region of the driver, such as at the interior rearview mirror assembly 18 (such as disposed behind and viewing through the mirror reflective element of the interior rearview mirror assembly). The driver monitoring camera 14 and system 12 may utilize any suitable driver monitoring camera and system to capture image data of an interior portion of the vehicle, such as respective head regions of a driver and/or one or more occupants of the vehicle (such as by utilizing aspects of the driver/occupant monitoring systems described in International Publication Nos. WO 20223/220222; WO 2023/034956; WO 2022/241423 and/or WO 2022/187805, which are hereby incorporated herein by reference in their entireties). The system processes the captured image data to perform facial recognition on the driver and/or one or more occupants of the vehicle to determine identities or profiles associated with the recognized occupants. In response to determining a profile associated with the driver and/or occupant in the vehicle, the occupant preference system adjusts the settings (e.g., seat positioning, rearview mirror positioning, and the like) to match the stored settings associated with the profile.

In some examples, the system determines profiles associated with the driver and one or more other occupants of the vehicle and adjusts settings based on the position of the driver and one or more other occupants within the cabin of the vehicle. For example, the vehicle may be equipped with dual zone climate control, where HVAC settings are separately adjustable for the driver seat position and the front passenger seat position, and the preference control system may adjust the HVAC setting for the driver seat position and the front passenger seat position independently based on determined profiles corresponding to the driver and passenger. Similarly, the system may determine one or more profiles associated with one or more occupants in rear seat positions and independently set HVAC settings for the rear seat positions based on the determined profiles.

If the preference control system determines a plurality of profiles associated with the driver and one or more occupants, but the system is unable to regionalize or independently adjust vehicle settings to achieve the settings associated with each profile, the system may adjust the setting to the setting corresponding to the profile of the driver. For example, the driver profile and a profile associated with another occupant may have different settings for the audio system of the vehicle (e.g., a different volume setting, a different radio station, and the like). Because the audio system may only adjust to one setting at a time, the setting associated with the driver profile is selected. Optionally, the hierarchy of controlling profiles may be adjusted by the user, such that the preference control system may default to settings associated with an occupant over settings associated with a driver when the vehicle is being operated as a fleet vehicle or chauffeur-driven vehicle.

Further, the preference control system may determine the identity of the driver and/or one or more occupants prior to the driver and/or one or more occupants entering the vehicle. For example, based on processing of image data captured by one or more exterior viewing cameras at the vehicle (e.g., a sideward viewing camera at the exterior mirror of the vehicle), the system may determine a profile associated with a driver approaching a driver door of the vehicle and adjust the vehicle settings accordingly. The profile associated with the determined driver and/or occupant may include entry settings (e.g., an entry seat position, an entry steering wheel position, and the like) for when the driver enters the vehicle and driving or operating settings for when the driver is operating the vehicle. Accordingly, the system may determine the profile associated with the driver and/or occupant prior to the driver and/or occupant entering the vehicle to adjust the settings to the entry settings associated with the determined profile and, after the driver and/or occupant enters the vehicle, the system may adjust to the operating settings associated with the determined profile.

The vehicle may be further equipped with a biometric sensor, such as a microphone or fingerprint scanner, that is configured to capture sensor that data that may be processed to determine the profile associated with the identity of the user. For example, the system may determine the identity of the vehicle occupant based on a spoken phrase or word associated with the occupant's profile. The biometric sensor may be disposed within the vehicle cabin, and/or the biometric sensor may be disposed at an exterior position of the vehicle (e.g., a finger print scanner at the exterior door handle grasping portion) for determining the profile associated with the driver and/or occupant prior to entry to the vehicle.

The occupant preference system may be configured to store setting configurations or profiles for any number of vehicle drivers and/or occupants. Thus, many drivers or occupants may be able to store personalized settings for driving or occupying the vehicle. The profiles and setting configurations may be stored at on-board memory storage of the vehicle. Optionally, the profiles and setting configurations may be stored at a remote server and the system of the vehicle may wirelessly communicate with the remote server to store and retrieve profiles and setting configuration information for an identified occupant. For example, the ECU may include a wireless communication module (e.g., a transmitting and receiving antenna) configured to wirelessly communicate with the remote server, such as over a cellular network. Thus, the profile and setting configurations may be stored remote from the vehicle and accessed by occupant preference systems of a plurality of vehicles. For example, a fleet of vehicles (e.g., vehicles used for public transport, construction vehicles, delivery vehicles, and the like) may be equipped with the preference system, and the driver profiles and setting configurations may be shared across the fleet of vehicles. In this example, a driver may manually store their settings in a first fleet vehicle, and if the driver is identified by the preference system of a second vehicle, the second vehicle may automatically adjust settings according to the settings stored by the first vehicle. Thus, a driver's settings may be stored and applied to a particular vehicle without the driver having ever previously driven or occupied that particular vehicle.

Thus, the driver or occupant preference system is operable to adjust one or more vehicle settings based on the stored settings configuration associated with a determined driver or occupant profile. The profile of the vehicle driver or occupant may be determined by the driver monitoring system capturing image data representative of the head region of the driver or occupant and processing the captured image data to determine an identity of the driver or occupant corresponding to the profile. In response to determining the profile corresponding to the identity of the vehicle occupant, the system retrieves the settings configuration from memory storage (e.g., on-board at the vehicle or at a remote server) and adjusts one or more settings of the vehicle systems (e.g., seat positioning, rearview mirror positioning, climate controls, and the like) to match corresponding stored settings of the settings configuration.

In other words, the driver performs or adjusts the settings manually for the first time. Once the settings are adjusted and set, the vehicle saves or stores the settings, such as the seat position coordinates in the 3D plane (X, Y, Z axes). For ambience, and air fresheners, the system may save the color (e.g., color of light emitted by interior cabin lights), odor or scent (e.g., a pine scent, a cedar scent, a flower scent, and the like, which may be sprayed or emitted by an air freshening device or element, such as at an air vent of the HVAC system of the vehicle), selected by the user.

When a user sits in the vehicle, the user may perform the vehicle adjustments and save it under their profile. The system stores selected options under the user profile. Next time, when the user sits in the vehicle, they may activate their profile to automatically adjust any and all stored settings as per their stored information. This activation may be done in one or more ways, such as facial recognition, voice recognition, biometric identification, or the user may select the profile manually. If the user wishes to modify the settings, they can do so and save it again. Optionally, the user may save multiple settings in the user's profile and the user may provide voice commands (or other input) to select one or more saved settings from a plurality of saved settings. For example, the user may save multiple seat and mirror and lighting and scent and radio/infotainment settings, and may select an appropriate one for the type of drive the user is undertaking (e.g., the user may prefer a different setting for a long drive as compared to a short drive). The system may identify the user or driver (such as when the user enters the vehicle and sits in the driver seat) and initially set the vehicle settings to a default setting (for that user/driver), and then the user or driver may change to a different saved setting (for any or all of the systems that have saved settings/preferences) responsive to a voice command or other input from the user or driver.

The system automatically adjusts the settings and interior as per the driver's requirements and comfort. These automatic adjustments may include seat height and seat position adjustment, rear view and side view mirror adjustment, steering adjustments, ambience color, type of car fresheners, dashboard or gauge cluster configurations, and the like.

A vehicle may be operated or occupied by multiple users in one family or group. Similarly, for taxi or other service companies, the vehicle may be operated or occupied by multiple drivers. Every time a new driver operates or occupies the vehicle, the new driver may adjust the vehicle settings to his or her preferred settings and adjustments, such as seat, mirrors, and climate control settings. Repeatedly adjusting settings each time a user occupies or operates the vehicle may be tiring or provide a nuisance and sometimes the driver may have to perform adjustments while driving when the mirrors or seats are not adjusted properly. The system allows each driver to save their profile and once they are driving the vehicle, they will activate their profile or the system may automatically select their profile. Thus, any driver may have a personalized experience in the vehicle.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 10,819,943; 9,555,736; 6,690, 268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-

0352953; US-2016-0036917 and/or US-2016-0210853, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,958,830; 10,065, 574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/508,351, filed Nov. 14, 2023, now U.S. Pat. No. 12,393,089, and/or Ser. No. 18/535,183, filed Dec. 11, 2023, now U.S. Pat. No. 12,403,931, and/or International Publication Nos. WO 2023/220222; WO 2023/034956; WO 2022/241423 and/or WO 2022/187805, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:

a camera disposed at an interior portion of an interior cabin of a vehicle equipped with the vehicular driver monitoring system, wherein the camera views at least (i) a head region of a driver of the vehicle and (ii) a head region of a passenger of the vehicle;

wherein the camera comprises a CMOS imaging array having at least one million photosensors arranged in rows and columns;

an electronic control unit (ECU);

wherein image data captured by the camera is transferred to the ECU;

wherein the ECU comprises electronic circuitry and associated software, and wherein the electronic circuitry comprises an image processor operable to process image data transferred to the ECU, and wherein the ECU processes image data transferred to the ECU to determine (i) a driver profile associated with the driver and (ii) a passenger profile associated with the passenger;

wherein a first accessory of the vehicle is operable in a driver-setting and in a passenger-setting;

wherein, based on the determined driver profile, the driver-setting of the first accessory of the vehicle is set based on a stored setting of the first accessory that corresponds to the determined driver profile;

wherein, based on the determined passenger profile, the passenger-setting of the first accessory of the vehicle is set based on a stored setting of the first accessory that corresponds to the determined passenger profile;

wherein a plurality of stored settings of the first accessory respectively correspond to the determined driver profile and the determined passenger profile, and wherein the driver-setting of the first accessory of the vehicle is set based on a selected one of the plurality of stored settings of the first accessory that corresponds to the determined driver profile, and wherein the passenger-setting of the first accessory of the vehicle is set based on a selected one of the plurality of stored settings of the first accessory that corresponds to the determined passenger profile; and wherein the selected one of the plurality of stored settings that respectively corresponds to the determined driver profile and the determined passenger profile is selected based on a user input.

2. The vehicular driver monitoring system of claim 1, wherein the first accessory comprises a heating, ventilation, and air conditioning (HVAC) system of the vehicle, and wherein the driver-setting of the first accessory comprises at least one selected from the group consisting of (i) a driver-selected temperature setting of the HVAC system, (ii) a driver-selected fan intensity setting of the HVAC system and (iii) a driver-selected vent selection setting of the HVAC system.

3. The vehicular driver monitoring system of claim 1, wherein the first accessory comprises a driver seat of the vehicle and a passenger seat of the vehicle, and wherein the driver-setting of the first accessory comprises a driver-selected positioning for the driver seat of the vehicle.

4. The vehicular driver monitoring system of claim 1, wherein based on the determined driver profile and the determined passenger profile, a setting of a second accessory of the vehicle is set based on one selected from the group consisting of (i) a stored setting of the second accessory that corresponds to the determined driver profile and (ii) a stored setting of the second accessory that corresponds to the determined passenger profile.

5. The vehicular driver monitoring system of claim 4, wherein the second accessory comprises an audio system of the vehicle, and wherein the setting of the second accessory comprises at least one selected from the group consisting of (i) a volume setting of the audio system, (ii) a media source setting of the audio system and (iii) a tuning setting of the audio system.

6. The vehicular driver monitoring system of claim 4, wherein the second accessory comprises one or more rearview mirrors of the vehicle, and wherein the setting of the second accessory is set based on the stored setting of the second accessory that corresponds to the determined driver profile, and wherein the setting of the second accessory comprises positioning for the one or more rearview mirrors of the vehicle.

7. The vehicular driver monitoring system of claim 6, wherein the one or more rearview mirrors comprises a driver side exterior rearview mirror and a passenger side exterior rearview mirror.

8. The vehicular driver monitoring system of claim 6, wherein the one or more rearview mirrors comprises an interior rearview mirror.

9. The vehicular driver monitoring system of claim 4, wherein the second accessory comprises an interior ambient lighting system of the vehicle, and wherein the setting of the second accessory comprises an illumination setting for the interior ambient lighting system, and wherein the interior ambient lighting system comprises one or more light sources that, when electrically operated, emits light within the interior cabin of the vehicle to provide ambient lighting within the interior cabin of the vehicle.

10. The vehicular driver monitoring system of claim 9, wherein the illumination setting is set to control at least one selected from the group consisting of (i) a color of the light emitted by the one or more light sources and (ii) a brightness of the light emitted by the one or more light sources.

11. The vehicular driver monitoring system of claim 4, wherein the second accessory comprises a heating, ventilation, and air conditioning (HVAC) system of the vehicle, and wherein the setting of the second accessory comprises an air freshener scent for air circulated within the interior cabin of the vehicle.

12. The vehicular driver monitoring system of claim 4, wherein the respective stored settings of the first accessory and the respective stored settings of the second accessory are retrieved from a memory storage device based on the determined driver profile and the determined passenger profile.

13. The vehicular driver monitoring system of claim 12, wherein the memory storage device is disposed at the vehicle.

14. The vehicular driver monitoring system of claim 12, wherein the memory storage device comprises a remote server remote from the vehicle and in wireless communication with the vehicle.

15. The vehicular driver monitoring system of claim 14, wherein the remote server is configured to provide the respective stored settings to one vehicle of a plurality of vehicles equipped with the vehicular driver monitoring system.

16. The vehicular driver monitoring system of claim 15, wherein the respective stored settings are provided to the one vehicle of the plurality of vehicles equipped with the vehicular driver monitoring system based on the one vehicle of the plurality of vehicles wirelessly transmitting the image data captured by the camera to the remote server.

17. The vehicular driver monitoring system of claim 1, wherein the stored setting of the first accessory that corresponds to the determined driver profile and the stored setting of the first accessory that corresponds to the determined passenger profile are stored in memory as part of respective vehicle settings configurations that correspond to the respective determined profiles, and wherein the vehicle settings configurations each comprise a plurality of stored settings of a plurality of respective accessories of the vehicle.

18. A vehicular driver monitoring system, the vehicular driver monitoring system comprising:

a camera disposed at an interior portion of an interior cabin of a vehicle equipped with the vehicular driver monitoring system, wherein the camera views at least (i) a head region of a driver of the vehicle and (ii) a head region of a passenger of the vehicle;

wherein the camera comprises a CMOS imaging array having at least one million photosensors arranged in rows and columns;

an electronic control unit (ECU);

wherein image data captured by the camera is transferred to the ECU;

wherein the ECU comprises electronic circuitry and associated software, and wherein the electronic circuitry comprises an image processor operable to process image data transferred to the ECU, and wherein the ECU processes image data transferred to the ECU to determine (i) a driver profile associated with the driver and (ii) a passenger profile associated with the passenger;

wherein a first accessory of the vehicle is operable in a driver-setting and in a passenger-setting;

wherein, based on the determined driver profile, the driver-setting of the first accessory of the vehicle is set based on a stored setting of the first accessory that corresponds to the determined driver profile;

wherein, based on the determined passenger profile, the passenger-setting of the first accessory of the vehicle is set based on a stored setting of the first accessory that corresponds to the determined passenger profile;

wherein based on the determined driver profile and the determined passenger profile, a setting of a second accessory of the vehicle is set based on one selected from the group consisting of (i) a stored setting of the second accessory that corresponds to the determined driver profile and (ii) a stored setting of the second accessory that corresponds to the determined passenger profile;

wherein the stored settings of the first accessory and the second accessory that correspond to the determined driver profile and the stored settings of the first accessory and the second accessory that correspond to the determined passenger profile are stored in memory as part of respective vehicle settings configurations that correspond to the respective determined profiles, and wherein the vehicle settings configurations each comprise a plurality of stored settings of a plurality of respective accessories of the vehicle;

wherein a plurality of stored settings of the first accessory respectively correspond to the determined driver profile and the determined passenger profile, and wherein the driver-setting of the first accessory of the vehicle is set based on a selected one of the plurality of stored settings of the first accessory that corresponds to the determined driver profile, and wherein the passenger-setting of the first accessory of the vehicle is set based on a selected one of the plurality of stored settings of the first accessory that corresponds to the determined passenger profile; and wherein the selected one of the plurality of stored settings that respectively corresponds to the determined driver profile and the determined passenger profile is selected based on a user input.

19. The vehicular driver monitoring system of claim 18, wherein the first accessory comprises a heating, ventilation, and air conditioning (HVAC) system of the vehicle, and wherein the driver-setting of the first accessory comprises at least one selected from the group consisting of (i) a driver-selected temperature setting of the HVAC system, (ii) a driver-selected fan intensity setting of the HVAC system and (iii) a driver-selected vent selection setting of the HVAC system.

20. The vehicular driver monitoring system of claim 18, wherein the first accessory comprises a driver seat of the vehicle and a passenger seat of the vehicle, and wherein the driver-setting of the first accessory comprises a driver-selected positioning for a driver seat of the vehicle.

21. The vehicular driver monitoring system of claim 18, wherein the second accessory comprises one or more rearview mirrors of the vehicle, and wherein the setting of the second accessory is set based on the stored setting of the second accessory that corresponds to the determined driver profile, and wherein the setting of the second accessory comprises positioning for the one or more rearview mirrors of the vehicle.

22. The vehicular driver monitoring system of claim 18, wherein the respective stored settings of the first accessory and the respective stored settings of the second accessory are retrieved from a memory storage device based on the determined driver profile and the determined passenger profile.

23. A vehicular driver monitoring system, the vehicular driver monitoring system comprising:

a camera disposed at an interior portion of an interior cabin of a vehicle equipped with the vehicular driver monitoring system, wherein the camera views at least (i) a head region of a driver of the vehicle and (ii) a head region of a passenger of the vehicle;

wherein the camera comprises a CMOS imaging array having at least one million photosensors arranged in rows and columns;

an electronic control unit (ECU);

wherein image data captured by the camera is transferred to the ECU;

wherein the ECU comprises electronic circuitry and associated software, and wherein the electronic circuitry comprises an image processor operable to process image data transferred to the ECU, and wherein the ECU processes image data transferred to the ECU to determine (i) a driver profile associated with the driver and (ii) a passenger profile associated with the passenger;

wherein a first accessory of the vehicle is operable in a driver-setting and in a passenger-setting, and wherein the first accessory comprises a heating, ventilation, and air conditioning (HVAC) system of the vehicle;

wherein, based on the determined driver profile, the driver-setting of the HVAC system is set based on a stored setting of the HVAC system that corresponds to the determined driver profile;

wherein, based on the determined passenger profile, the passenger-setting of the HVAC system is set based on a stored setting of the HVAC system that corresponds to the determined passenger profile;

wherein based on the determined driver profile and the determined passenger profile, a setting of a second accessory of the vehicle is set based on one selected from the group consisting of (i) a stored setting of the second accessory that corresponds to the determined driver profile and (ii) a stored setting of the second accessory that corresponds to the determined passenger profile;

wherein a plurality of stored settings of the second accessory respectively correspond to the determined driver profile and the determined passenger profile, and wherein one selected from the group consisting of (i)

the setting of the second accessory of the vehicle is set based on a selected one of the plurality of stored settings of the second accessory that corresponds to the determined driver profile and (ii) the setting of the second accessory of the vehicle is set based on a selected one of the plurality of stored settings of the second accessory that corresponds to the determined passenger profile; and wherein the selected one of the plurality of stored settings that respectively corresponds to the determined driver profile and the determined passenger profile is selected based on a user input.

24. The vehicular driver monitoring system of claim 23, wherein the driver-setting and the passenger-setting of the HVAC system comprises at least one selected from the group consisting of (i) a temperature setting of the HVAC system, (ii) a fan intensity setting of the HVAC system and (iii) a vent selection setting of the HVAC system.

25. The vehicular driver monitoring system of claim 23, wherein the second accessory comprises an audio system of the vehicle, and wherein the setting of the second accessory comprises at least one selected from the group consisting of (i) a volume setting of an audio system of the vehicle, (ii) a media source setting of the audio system and (iii) a tuning setting of the audio system.

26. The vehicular driver monitoring system of claim 23, wherein the second accessory comprises one or more rearview mirrors of the vehicle, and wherein the setting of the second accessory is set based on the stored setting of the second accessory that corresponds to the determined driver profile, and wherein the setting of the second accessory comprises positioning for the one or more rearview mirrors of the vehicle.

27. The vehicular driver monitoring system of claim 26, wherein the one or more rearview mirrors comprises a driver side exterior rearview mirror and a passenger side exterior rearview mirror.

28. The vehicular driver monitoring system of claim 23, wherein the respective stored settings of the HVAC system and the respective stored settings of the second accessory are retrieved from a memory storage device based on the determined driver profile and the determined passenger profile, and wherein the memory storage device is disposed at the vehicle.

* * * * *